US008815101B2

(12) United States Patent
Brown et al.

(10) Patent No.: US 8,815,101 B2
(45) Date of Patent: Aug. 26, 2014

(54) SEDIMENT REMOVAL TANK AND SYSTEM

(75) Inventors: Juan Brown, Maturin (VE); Johanna Guerrero, Ciudad Guayana (VE); Alvaro Quezada, El Tigrito (VE); Lenin Garcia, Maturin (VE)

(73) Assignee: Intevep, S.A., Caracas (VE)

( * ) Notice: Subject to any disclaimer, the term of this patent is extended or adjusted under 35 U.S.C. 154(b) by 403 days.

(21) Appl. No.: 13/269,827

(22) Filed: Oct. 10, 2011

(65) Prior Publication Data
US 2013/0087515 A1  Apr. 11, 2013

(51) Int. Cl.
*B01D 17/028* (2006.01)
*B01D 21/02* (2006.01)
*C02F 1/00* (2006.01)
*B01D 21/00* (2006.01)
*B01D 17/02* (2006.01)
*B01D 21/24* (2006.01)

(52) U.S. Cl.
CPC ............ *C02F 1/001* (2013.01); *B01D 21/0054* (2013.01); *B01D 17/0211* (2013.01); *B01D 2021/0078* (2013.01); *B01D 21/2427* (2013.01); *B01D 17/0214* (2013.01); *B01D 21/0024* (2013.01); *B01D 21/0042* (2013.01); *B01D 21/245* (2013.01); *C02F 2001/007* (2013.01); *C02F 2301/028* (2013.01)
USPC ........... 210/801; 210/803; 210/521; 210/536; 210/540

(58) Field of Classification Search
CPC ........... B01D 17/0211; B01D 17/0214; B01D 21/0042; B01D 21/0054; B01D 21/02; B01D 21/10; B01D 21/2427; B01D 21/245; B01D 2021/0078; B01D 21/0024; C02F 2001/007; C02F 2301/028

USPC ............. 210/801, 803, 521, 523, 532.1, 533, 210/536, 538, 540
See application file for complete search history.

(56) References Cited

U.S. PATENT DOCUMENTS

| | | | |
|---|---|---|---|
| 299,744 A | 6/1884 | Cook | |
| 2,040,372 A | 5/1936 | Graham | |
| 2,230,386 A | 2/1941 | Pecker | |
| 2,572,098 A | 10/1951 | Baldwin | |
| 2,580,547 A | 1/1952 | Hollcroft | |
| 3,067,878 A * | 12/1962 | Genter et al. | 210/521 |
| 3,951,816 A * | 4/1976 | Bascope et al. | 210/525 |
| 4,048,069 A * | 9/1977 | Cuvillier et al. | 210/801 |
| 4,425,239 A * | 1/1984 | Jacocks et al. | 210/521 |
| 4,451,367 A | 5/1984 | Ruggeri | |
| 5,575,909 A * | 11/1996 | Foster | 210/521 |
| 5,900,149 A * | 5/1999 | Bradford | 210/521 |
| 5,911,241 A | 6/1999 | Roberts | |
| 6,371,308 B1 * | 4/2002 | Zhou | 210/533 |
| 6,920,984 B2 * | 7/2005 | Agnew | 210/533 |
| 2009/0184049 A1 * | 7/2009 | Murray et al. | 210/521 |

* cited by examiner

*Primary Examiner* — Christopher Upton
(74) *Attorney, Agent, or Firm* — Bachman & LaPointe, P.C.

(57) ABSTRACT

This invention relates generally to the field of separation of heterogeneous mixtures and, more particularly to a solid-liquid separating tank and system.

A settlement tank including: a tank wall defining a tank inner space; an internal wall structure in the inner space and defining a fluid flow path from a center of the inner space to a fluid outlet at the tank wall; and a plurality of drainage pipes having an open internal end and an outer end connected to a drainage manifold, wherein the open internal end is positioned at a bottom of the inner space to remove gravity decanted sediment and hydrostatically decanted water from the inner space.

8 Claims, 7 Drawing Sheets

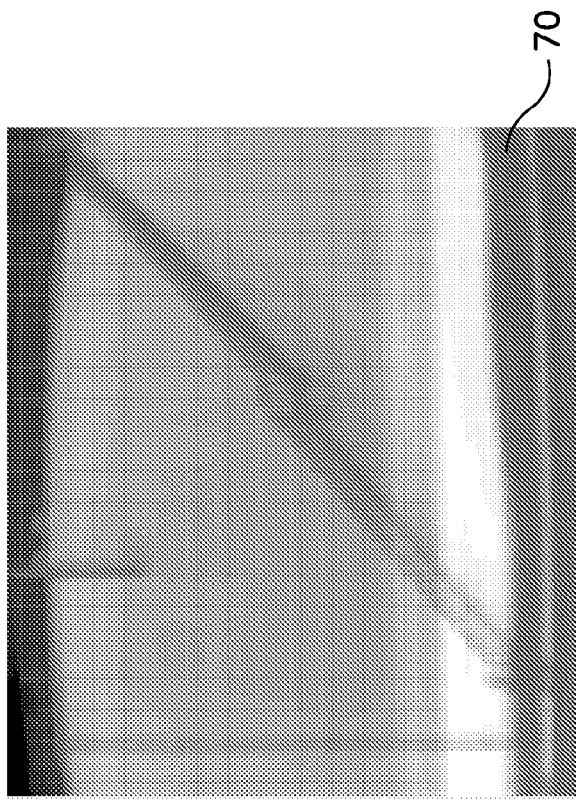
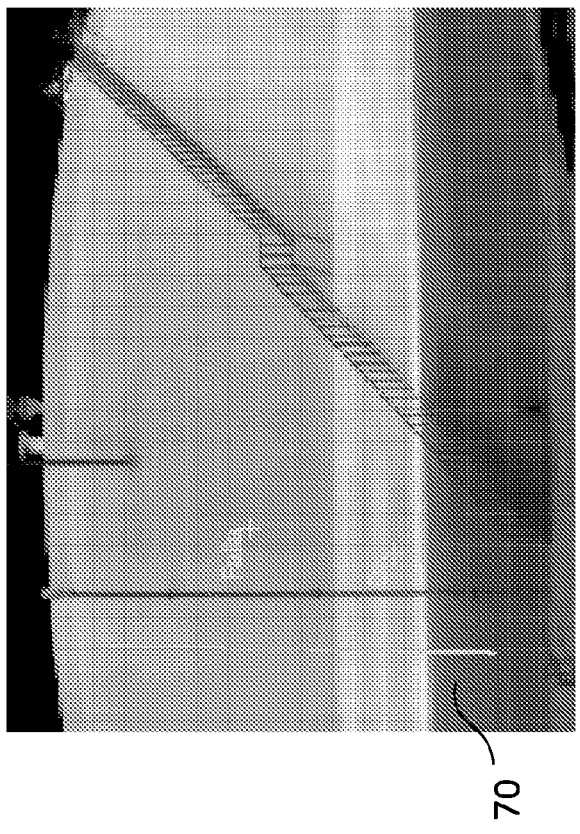
FIG. 8a
FIG. 8b

SEDIMENT REMOVAL TANK AND SYSTEM

BACKGROUND OF THE INVENTION

This invention relates generally to the field of separation of heterogeneous mixtures and, more particularly to a solid-liquid separating tank and system.

Many different areas of industry require the separation of heterogeneous mixtures. Production from wells in the oil and gas industry often contains particulates, such as sand. These particulates may be part of the formation from which the hydrocarbon is being produced, introduced particulates from hydraulic fracturing or fluid loss material from drilling mud fracturing fluids or from phase change of produced hydrocarbons caused by changing conditions, as the hydrocarbons are transported to the surface.

Various devices have been used to remove solids from production fluids. Solid materials have been removed from liquids by mechanical clarification, which is followed by sedimentation in a clarifier. Solid material may also be removed by filtration or sedimentation storage. Settlement tanks are used for sedimentation storage in oil production. These tanks are typically circular or rectangular structures that have sloped and horizontal bottoms, which collect and store the solid material as it settles from the liquid. The sloped bottom tanks are periodically drained and the solids that have accumulated on the bottom are flushed out through drains in the tank floor. Tanks with horizontal bottoms have hardened clumped solids that remain in the tanks for extended periods of time. The tank is drained and the solid paste is removed manually. Removal of the accumulated solid material is an important part of the oil production process; however, drainage of the tank slows production and increases cost

SUMMARY OF THE INVENTION

The primary object of the present invention is the creation of a settlement tank that allows for a quick, continuous, convenient and inexpensive removal of solid material from production fluid, in the tank.

It is a further object of the present invention to provide a system for removing solid material from the settlement tank.

It is a still further object of the present invention to provide a method for the removal of solid material from a fluid.

In accordance with the present invention a settlement tank is provided comprising: a fluid inlet at a center of the tank surrounded by an internal wall structure, wherein the internal wall structure defines a fluid flow path that increases in the flow area with increasing distance away from the center of the tank; a plurality of dispersed drainage pipes having a 90° elbow at an open internal end within the tank and an outer end connected to a drainage manifold, wherein gravity decanted sediment and hydrostatically decanted water within the fluid is removed through the drainage pipes.

In further accord with the present invention a solid material removal system is provided comprising: a fluid inlet at a center of the tank surrounded by an internal wall structure, wherein the internal wall structure defines a fluid flow path that increases in flow area with increasing distance away from the center of the tank; a plurality of dispersed drainage pipes having a 90° elbow at an open internal end within the tank and an outer end connected to a drainage manifold, wherein gravity decanted sediment and hydrostatically decanted water within the fluid is removed through the drainage pipes.

In still further accord with the present invention a method of removing solid material from a fluid is provided comprising the steps of: directing the fluid to a fluid inlet pipe at the center of a settlement tank having an internal wall structure, wherein the internal wall structure defines a fluid flow path wherein the fluid flow path increases in the flow area with increasing distance away from the center of the tank; and wherein the tank further comprises a plurality of dispersed drainage pipes having a 90° elbow at an open internal end within the tank wherein the fluid is introduced to the tank at a flow rate sufficient to provide a residence time in the tank of at least 24 hours; and an outer end connected to a drainage manifold; removing gravity decanted sediment and hydrostatically decanted water from the tank.

BRIEF DESCRIPTION OF THE DRAWINGS

A detailed description of preferred embodiments of the present invention follows, with reference to the attached drawings, wherein:

FIG. 8 is a thermal image comparing sediment removal from a conventional settlement tank to the settlement tank of the present invention.

DETAILED DESCRIPTION

The invention relates to solid-liquid separation; and, more particularly to a settlement tank which can be used to remove sediment from a fluid such as a crude hydrocarbon produced from a subterranean hydrocarbon producing well. The process runs on a substantially continuous basis. The cost effective settlement tank receives production fluid from the production stream and removes solid sediments such as sand, gravel well packing, peel rust, fine clay, metal filings, mixtures thereof and the like. The system and method can be adapted to specific types of sediment and/or fluid to obtain separation as desired.

The present invention operates on the basis of settlement or sedimentation and these terms may be used interchangeably herein to refer to a process of decantation of a liquid or solid to the bottom of a collection or separation device or tank.

Figure 1:
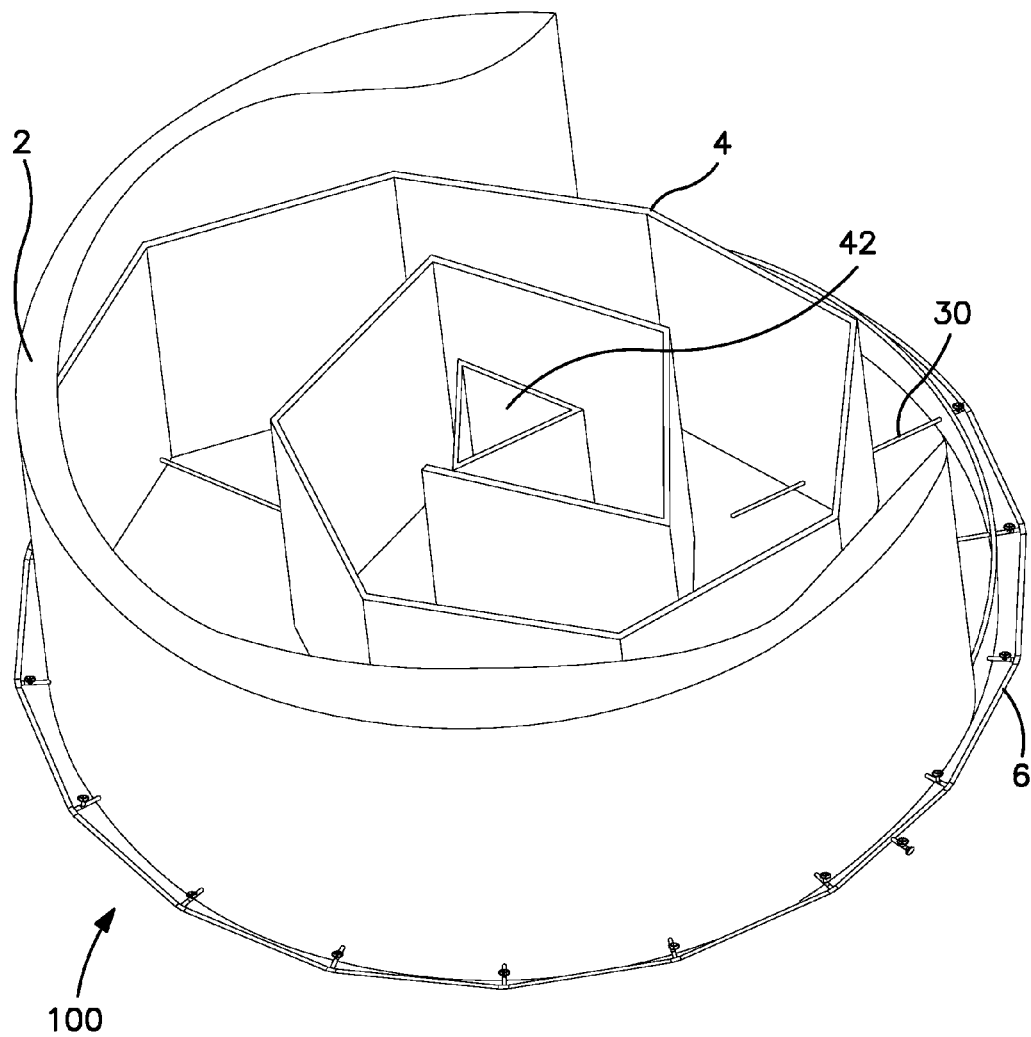
FIG. 1 illustrates a sediment removal tank according to the present invention.

As shown in FIG. 1, settlement tank 100 of the present invention has an outer wall 2 and a substantially spiral inner wall structure 4. The spiral wall structure 4 defines a flow path for fluids passing through tank 100. This path defined by spiral wall structure 4 allows solids entrained in the fluid to decant along the path, and the spiral shape of the path produces a longer path than would be possible in conventional settling structures having a simple tank. The spiral wall structure 4 utilizes the total tank capacity for decantation of the solid. As a result, the liquid remains in the tank longer, allowing for a longer decantation of the solid material.

Spiral wall structure 4 is advantageously defined by a series of flat wall sections which can be mounted to the floor of tank 100 in order to define the substantially spiral flow path. This provides for a relatively simple manufacture of the spiral wall. Of course, the spiral wall can be provided by other means, including, for example, a substantially smooth spiraling wall and the like.

Figure 2:
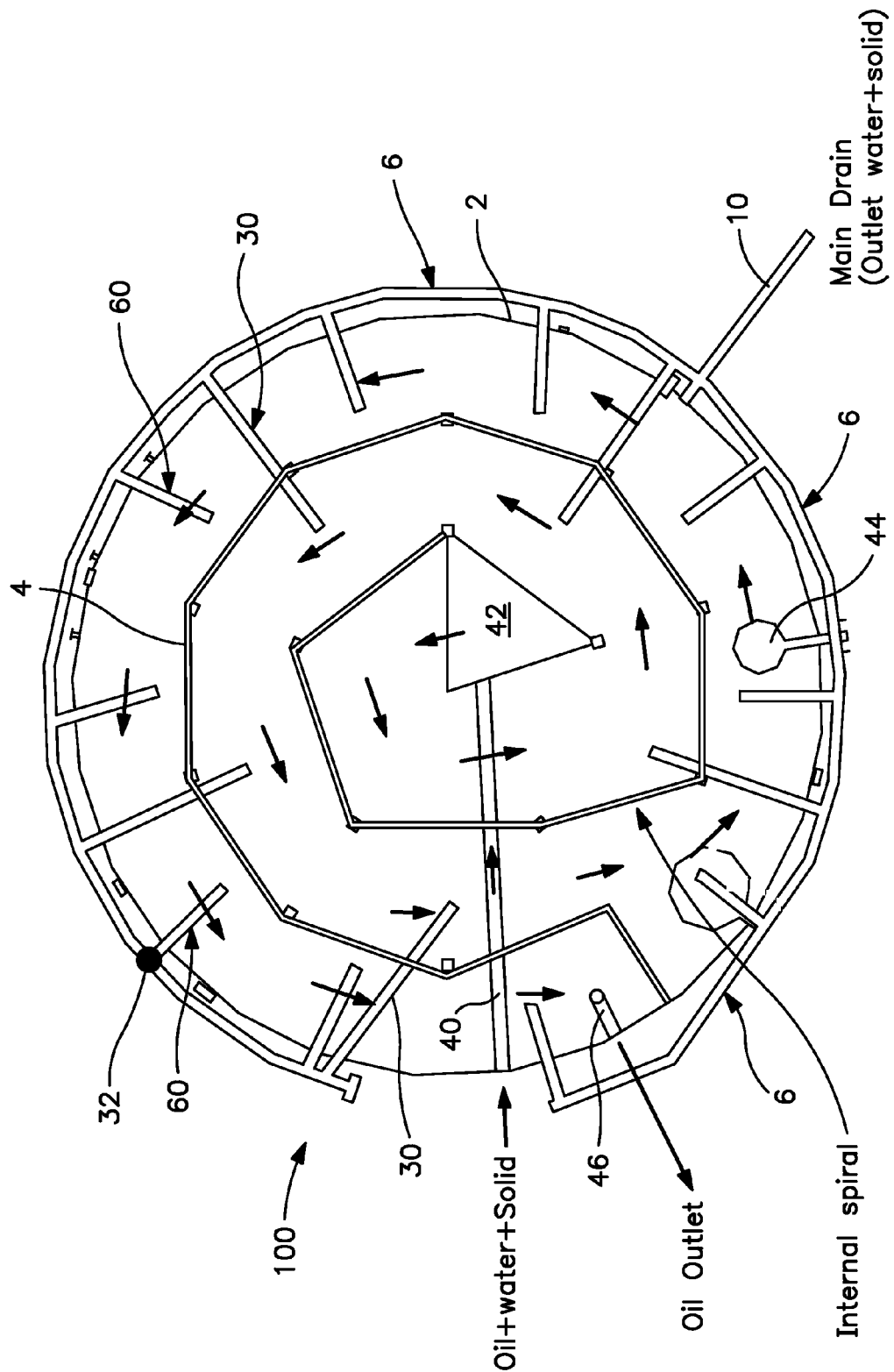
FIG. 2 illustrates a fluid flow within the sediment removal tank of the present invention.

FIG. 2 details fluid flow within settlement tank 100. Production fluid enters tank 100 through inlet 40 which may be a pipe leading to a central area of tank 100. The fluid exits inlet 40 and enters the spiral wall structure 4 at the center 42 of tank 100. As indicated by the arrows, the fluid flows from center 42 through tank 100 while sediment decants and settles to the bottom of the tank. Depending upon the levels of sediment and solids in the fluid, flow rate can be controlled to provide a desired amount of settling. For example, fluid may take up to 24 hours to flow through tank 100. During this 24-hour residence time in tank 100, solid within the fluid is decanted by gravity to the bottom of tank 100. In addition, hydrostatic forces within the fluid in tank 100 spur water incorporated in the fluid to settle in the bottom of tank 100, and lighter liquid fractions to rise to the top.

Figure 4A:
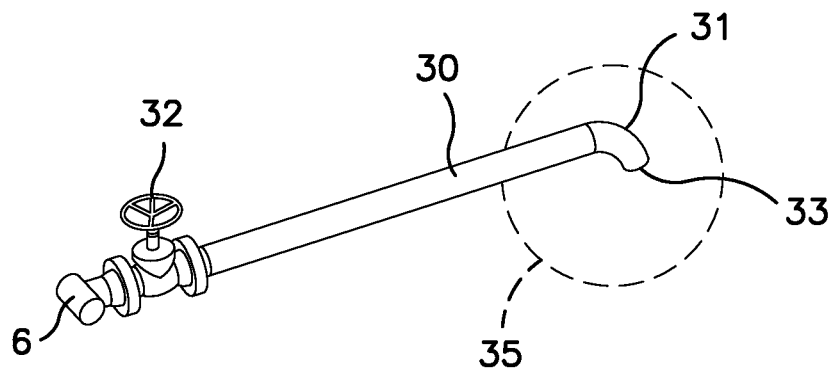
FIGS. 4a and 4b illustrate drainage pipes according to the invention.

As the fluid reaches the outside of spiral 4, the velocity and temperature of the fluid is preferably maintained. When separating typical formation sediment from a crude hydrocarbon, it is desirable to maintain the tank at the optimum operating temperature of between about 180 and about 200° F. Fluid can optionally be pumped through a recirculator 44 and a heater (not shown) to add heat adjusted fluid back to inlet 42. Tank 100 advantageously has a series of drainage points which are located for removal of sediment settled during operation of tank 100. These drainage points can be defined with several advantageous structures. Such structures are illustrated, for example, in FIGS. 4a and 4b, wherein FIG. 4a illustrates a drainage point defined by a drainage pipe 30 having an elbow 31 to define a downwardly-opening inlet 33. This type of pipe helps to define a suction vortex which removes sediment from the area 35 beneath the pipe in a substantially cone-shaped pattern, and this is advantageous according to the invention.

Figure 4B:
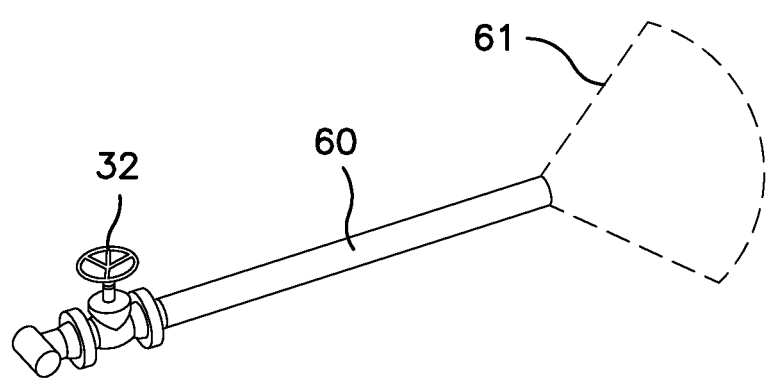

FIG. 4b illustrates a horizontal drainage pipe 60 which can be used to suction off sediment from the bottom of the tank in a substantially horizontal triangular-shaped area 61 which, in this instance, does not create any type of vortex flow. Horizontal drainage pipes 60 are therefore advantageously positioned within tank 100 where such vortex flow is not desired. The combination of horizontal and vertical drainage pipes 60, 30, spaced along the path defined by tank 100, allows for substantially continuous and efficient removal of sediment as it settles within tank 100. Still referring to FIGS. 4a and 4b, each of these drainage pipes can have a valve 32 and then a further extension which connects to drainage manifold 6. In this way, valves 32 can be opened when it is desired to remove sediment from tank 100, at which point flow of the sediment will be directed through drainage pipes 30, 60, for example by hydrostatic pressure within the tank, and sediment will be removed by this flow. Valves 32 can be opened and closed by a control system which is not further illustrated herein.

Recirculator 44 (FIG. 2) pumps water into tank 100 as the fluid continues its steady flow around the inside of tank 100, until the fluid reaches at least one outlet 46.

The system may incorporate more than one outlet 46 as desired. In order to produce a desired level of separation, outlet 46 is strategically placed at points of slower fluid flow throughout the system. Finer solids will decant out of the production fluid as it approaches outlet 46. As a result, more solid decants from the fluid. Fine solid particles of less than 22 thousands of a millimeter are decanted. The resulting hydrocarbon product can thereby contain less than 1.2% wt. of both water and sediment.

Figure 3:
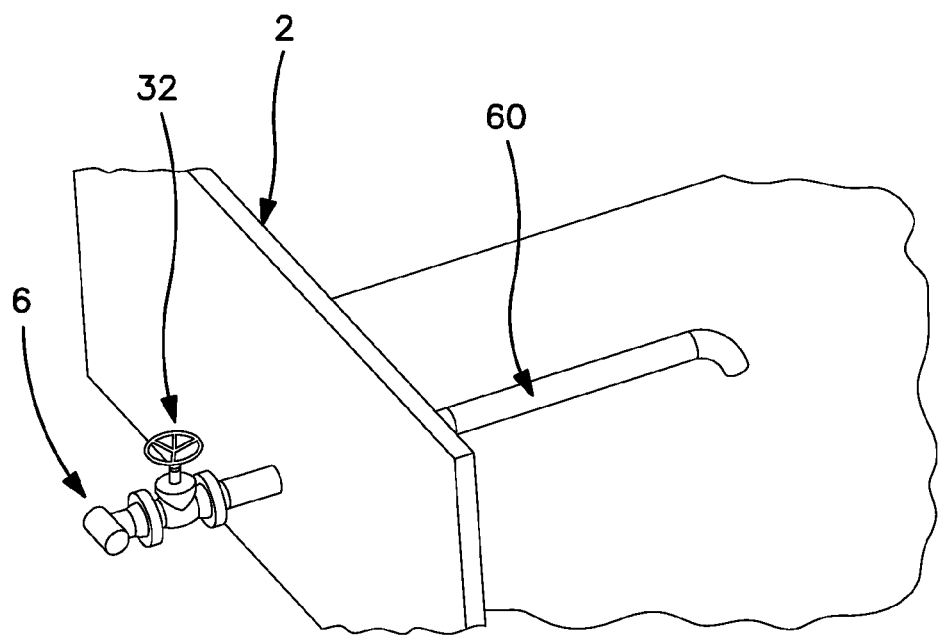
FIG. 3 illustrates the drainage manifold and main drain of the present invention.

Referring back to FIGS. 1 and 2, the solid material removal system includes a drainage manifold 6 which can be shaped to conform to the shape of tank 100. As solid material builds in tank 100, the solid material decants into point drains or circular collectors throughout the tank. Drainage pipes 30, 60 connected to manifold 6 through valves 32 as shown in FIG. 3 can be operated remove accumulated solids from tank 100 as explained above.

Drainage pipes 30 may have a 90° elbow at the end within tank 100, and this provides for a suction vortex type removal of solids. To remove solid laden material, drainage pipe 30 may be horizontally positioned through tank 100 so as to position the downwardly oriented inlet in each desired collection zone. As the solids build, drainage pipe 30 attached to the drainage manifold 6 by control valve 32 is operated to siphon bottom liquid and solid material from the collector. The drainage points are strategically placed within tank 100 according to the pattern of solid accumulation within each specifically unique tank.

Figure 5:
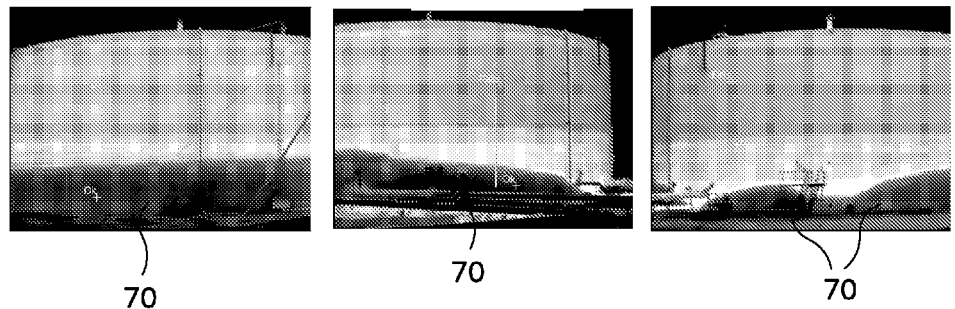
FIG. 5 is a thermal image of the solid accumulation of conventional settlement tanks.

As shown in FIG. 5, thermal images may be used to determine the pattern 70 of solid deposits within a tank. Each drainage pipe 30, 60 is preferably individually operated by a valve, such as valve 32, and can be programmed to operate continuously or periodically, and for example can be operated for a period of two (2) hours every thirty-two (32) hours. The drainage pipes 30, 60 may be operated simultaneously; however, it is preferred that each drainage pipes 30, 60 is operated individually. Valves 32 are in this way operated for one drainage pipe 30 for example for a period of 2 hours, then that valve 32 is closed and another valve 32 from another pipe 30, 60 is opened/operated for a period of 2 hours, then closed, and so on. The system may contain a plurality of drainage pipes all strategically placed and dispersed in areas of heavy solid deposits for optimal sediment removal.

Figure 6:
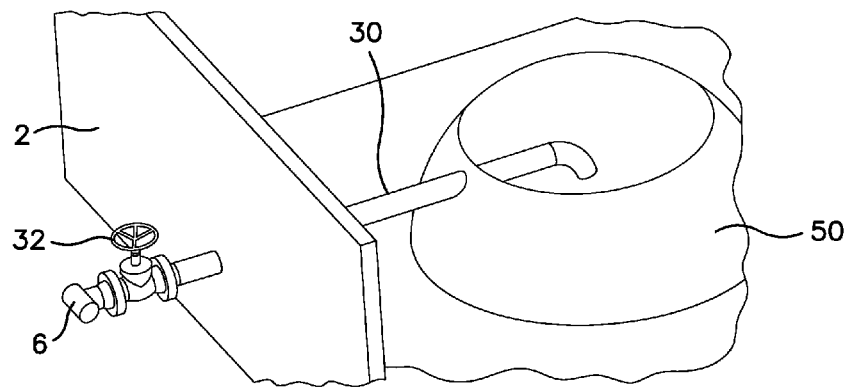
FIG. 6 illustrates hydrostatic removal of solids and water of the present invention.
Figure 7B:
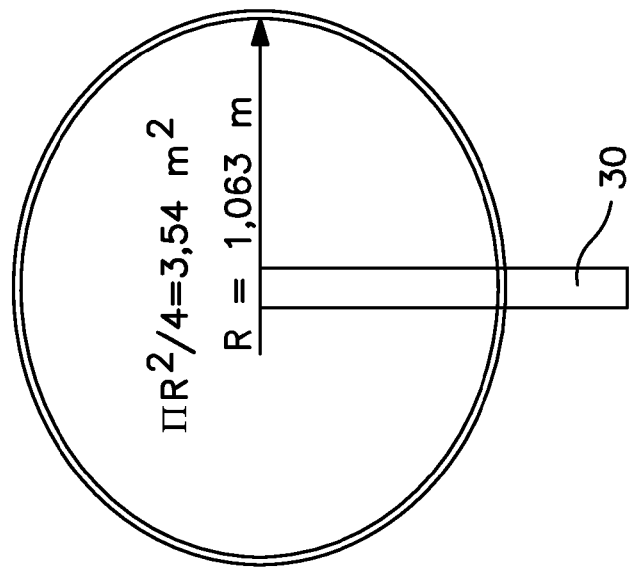
FIGS. 7a and 7b illustrates areas of hydrostatic removal of sediment for different drainage pipes according to the present invention.
Figure 7A:
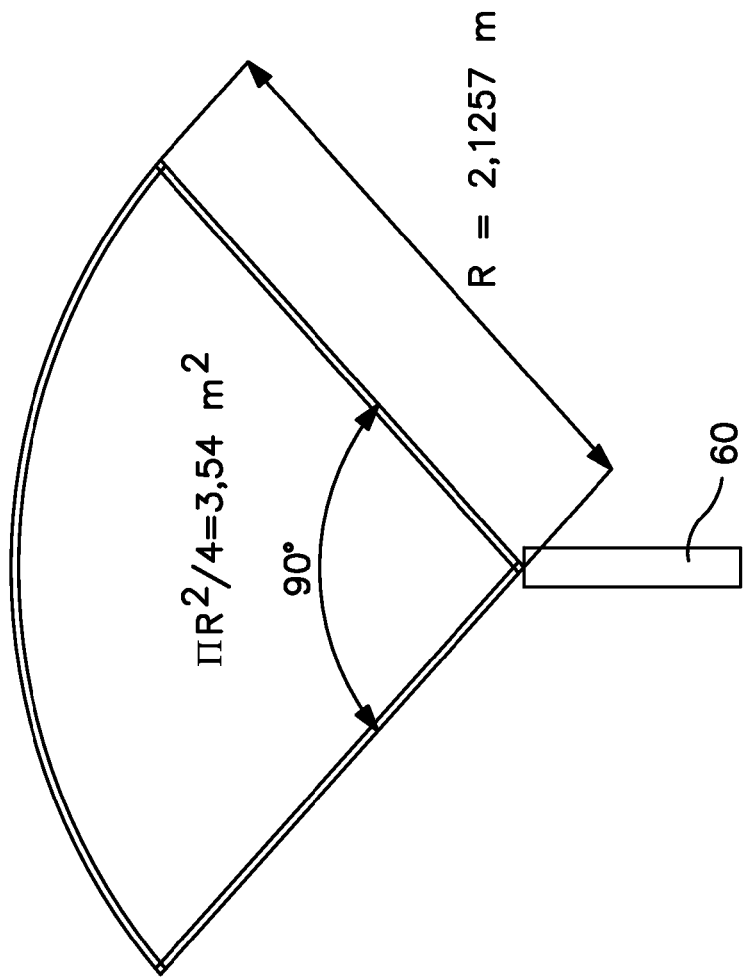

FIG. 6 depicts the theoretical dredging area 50 of solid laden material and water for a drainage pipe 30 having a 90° downwardly facing opening. As the drainage valve 32 is open, separated water flows by gravity into pipe 30 and the angular momentum of the water siphoned into drainage pipe 30 will create a three-dimensional vortex which helps to collect and remove sediment as desired. As shown in FIGS. 7a and 7b, cleaning areas are dependent upon the flow velocity and fluid type as well as orientation of the drainage inlet. FIG. 7a illustrates a 90° arc of sediment removal which can be obtained with a horizontally-opening drainage pipe. This pipe is referred to as drainage pipe 60, which is referred to above as being a horizontal drainage pipe. This removal would of course depend upon the actual velocity of flow into the drainage pipe, and this velocity is itself controlled by the hydrostatic pressure at the inlets to pipe 60, the viscosity of the fluid which will flow through the pipe carrying the sediment, the extent of opening of the valve allowing flow through pipe 60, and potentially various other factors. As mentioned above, this type of drainage pipe is useful in cleaning a wedge-shaped area of the bottom of tank 100 without creating a suction vortex.

FIG. 7b illustrates a top view of the area which can be cleaned utilizing a drainage pipe 30 having a downwardly-directed drainage inlet. This type of inlet creates a suction vortex, as indicated above, and that suction vortex can help clean a cone-shaped area of the bottom of the tank, for example as better illustrated in FIG. 6. The drainage obtained with horizontal drainage pipe 30 and vertical drainage pipe 60 creates cleaning areas of variable radius. The force and velocity of the water vortex pulls the solid material settled on the bottom of the tank or suspended in the water into the drainage pipe. Dependent upon the volume and properties of fluid within the tank, the vortex cleaning area may reach up to about 1.5 meters in diameter.

The drainage manifold 6 collects the solid material and commingled water from each drainage pipe 30. After collection, the solid laden material and water exit the drainage manifold 6 through main drain 10 (shown in FIG. 3). The solid material and water collected from tank 100 is sent to a clarification system or other treatment via main drain 10.

The solid material and commingled water are clarified in receiving wells. To facilitate the further decantation of the solid material, the laden liquid (not shown), can be passed to further separation equipment if desired such as collection tanks that may be well known within the art. The solid material can then be removed by machinery and manual techniques that are well known within the art. Once removed, the solids are deposited for bio remediation and/or any other suitable use depending upon the nature of the solids and commercial demand for such materials at the time.

The novel settlement tank of the present invention allows for the withdrawal of solid sediment and produced water from production fluids through use of the energy provided by a hydrostatic column. As fluid to be treated enters center 42 of tank 100 and flows through the spiral flow path of the tank, the water and solid materials within the fluid settle to the bottom of the tank. The preferred fluid speed along the spiral path ranges from about 0.001 m/s to about 0.01 m/s. If the fluid flows faster than 0.1 m/s, typical produced water and solid material will not settle to the bottom of the tank. If the fluid flows slower than 0.0009 m/s process efficiency will suffer, as the additional amount of separation does not justify the additional time needed.

FIG. 8 is a thermal image of a conventional settlement tank A, without internal walls, as compared to a settlement tank of the present invention B. After 547 days in continuous operation, thermal images were taken of both tanks A and B. The results of the solid accumulation 70 are provided in Table 1.

TABLE 1

|  | Traditional Tank A | Inventive Tank B |
| --- | --- | --- |
| Solid Volume | 2500 m³ | 780 m³ |
| Accumulation Rate | 4.37 m³/Day | 1.33 m³/Day |
| Maximum Height[1] | 14.1 feet | 6.40 feet |
| Average Height[1] | 7.71 feet | 2.30 feet |

[1]Of sediments on the tank bottom.

Sediment accumulation was reduced by at least 220%, precisely 228%, in novel Tank B as compared to traditional Tank A. Test data shows total accumulated solids of 660 m³/year for Tank B.

The total cost to clean solid sludge from a conventional settlement tank is estimated to be around US$1.4 million. The costs are extensive because the tank must be taken offline, emptied and manually dredged to remove the sludge. The cost of removing solids from the receiving wells of the present invention is estimated to be six times less expensive than known methods of solid removal from a sedimentation tank. Implementation of a conventional sediment/settlement tank into the current inventive solid settlement tank is estimated to be 6% of the total costs associated with one cleaning of a traditional settlement tank. The total yearly cost savings provided by the settlement tank of the present invention is estimated to be US$840,000.

In addition, the useful life of the settlement tank of the present invention is increased to more than double that of a conventional settlement tank due to management of the rate of increase in sediment and the continuous operation of the settlement tank of the present invention ensures the treatment of 55 million bbls/day (barrels/day) of heavy crude oil.

It is to be appreciated that the settlement tank and solid material removal system of the present invention may be incorporated into any solid sedimentation device regardless the geometry. For example, the wall structure of the tank or device, the tank or device itself and the drainage manifold may be rectangular, circular, squared, stared, mixtures thereof or the like. Any geometry that extends the flow of the liquid through the system while solids and water accumulate at the bottom of the system is contemplated by the present invention. In addition, the horizontal drainage pipes and corresponding collection sites may be strategically placed for optimal collection at any point throughout the settlement system.

The settlement tank and solid material removal system of the present invention may be implemented in other possible applications. The separation effects of the present invention may be employed in a variety of technologies in a variety of sizes. The final characteristics of the settlement tank and solid material removal system of the present invention may be applied to conventional well technology, any fluid treatment technology, sewage technology, solid-liquid separation technology and any application that may benefit from the solid-liquid separation properties of the present invention.

It is to be understood that the invention is not limited to the illustrations described and shown herein, which are deemed merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A settlement tank comprising:
a tank wall defining a tank inner space;
an internal wall structure in the inner space and defining a spiral fluid flow path from a center of the inner space to a main fluid outlet at a lower portion of the tank wall for removing water and solid material;
a plurality of drainage pipes having an open internal end and an outer end connected to a drainage manifold, wherein the open internal end is positioned at a bottom of the inner space to remove gravity decanted sediment and hydrostatically decanted water from the inner space, wherein some of the drainage pipes have horizontally disposed inlets and others of the drainage pipe have vertically disposed inlets, each drainage pipe has a flow control valve, wherein the drainage manifold communicates with the main fluid outlet; and
further comprising a plurality of fluid outlets communicated with an upper portion of the inner space at different heights above the bottom for removing a hydrocarbon product containing less than 1.2% wt of both water and sediment.

2. A method of removing solid material from a fluid comprising the steps of:
directing the fluid to a settlement tank comprising
a tank wall defining spiral a tank inner space;
an internal wall structure in the inner space and defining a fluid flow path from a center of the inner space to a main fluid outlet at the tank wall for removing water and solid material;
a plurality of drainage pipes having an open internal end and an outer end connected to a drainage manifold, wherein the open internal end is positioned at a bottom of the inner space to remove gravity decanted sediment and hydrostatically decanted water from the inner space, wherein some of the drainage pipes have horizontally disposed inlets and others of the drainage pipe have vertically disposed inlets, each drainage pipe has a flow control valve, wherein the drainage manifold communicates with the main fluid outlet; and so as to produce sediment and having liquid at a bottom of the settlement tank and light liquid at a top of the tank;

removing sediment and heavy liquid through the drainage pipes; and removing light liquid from a plurality of fluid outlets communicated with an upper portion of the inner space at different heights above the bottom for removing a hydrocarbon product containing less than 1.2% wt of both water and sediment.

3. The method of claim 2, wherein the fluid is passed through the flow path at a speed of between 0.001 and 0.1 m/s.

4. The method of claim 3, wherein sediment particles have an amount of less than 22 thousands of a millimeter.

5. The method of claim 2, wherein the water and solid material accumulate in the tank at a rate of $1 m^3$/day.

6. The method of claim 2, further comprising treating at least 55 million bbls/day of fluid in the tank.

7. The method of claim 2, wherein the solid material is selected from the group consisting of sand, gravel, well packing, peel rust, fine clay, metal filings and mixtures thereof.

8. The method of claim 2, wherein the fluid is selected from the group consisting of oil, gas, water, production fluid, and mixtures thereof.

\* \* \* \* \*